Sept. 20, 1966　　　G. W. STANTON ET AL　　　3,274,294
COMPOSITIONS COMPRISING GRAFT COPOLYMERS ON POLYESTER SUBSTRATES
OF ONE OR MORE MONOMERS FROM THE GROUP INCLUDING VINYL LACTAMS,
SULFONATED ALKENYL AND/OR ∝-HALO ALKENYL AROMATICS, SULFONATED
OLEFINS, SULFONATED ACRYLATES AND METHACRYLATES, VINYL
PYRIDINES, AMINATED ALKENYL AROMATICS, AMINATED
ACRYLATES AND METHACRYLATES, AND MONOMERIC
POLYGLYCOL ETHERS OF ALKENYL AROMATICS
Filed June 22, 1962

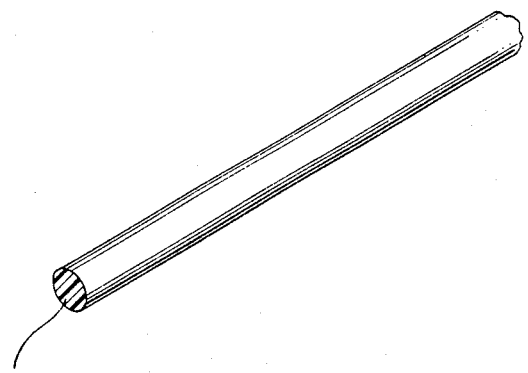

Filamentous article comprising a graft copolymer of certain olefinic monomers on a polyester polymer substrate.

INVENTORS.
George W. Stanton
BY　Teddy G. Traylor

Griswold & Burdick
ATTORNEYS

3,274,294
COMPOSITIONS COMPRISING GRAFT COPOLYMERS ON POLYESTER SUBSTRATES OF ONE OR MORE MONOMERS FROM THE GROUP INCLUDING VINYL LACTAMS, SULFONATED ALKENYL AND/OR α-HALO ALKENYL AROMATICS, SULFONATED OLEFINS, SULFONATED ACRYLATES AND METHACRYLATES, VINYL PYRIDINES, AMINATED ALKENYL AROMATICS, AMINATED ACRYLATES AND METHACRYLATES, AND MONOMERIC POLYGLYCOL ETHERS OF ALKENYL AROMATICS
George W. Stanton, Walnut Creek, and Teddy G. Traylor, Del Mar, Calif., assignors to The Dow Chemical Company, Midland, Mich., a corporation of Delaware
Filed June 22, 1962, Ser. No. 206,127
9 Claims. (Cl. 260—873)

This application is a continuation-in-part of copending application for United Letters Patent having Serial No. 711,939, filed January 29, 1958, now abandoned.

The present invention lies generally in the field of organic chemistry and contributes in particular to the art which pertains to synthetic, fiber-forming high polymers. More particularly, the present invention has reference to the provision of hydrophilic or ionic graft or block-type copolymers exhibiting improved dyeability and reduced static charge that are comprised of certain types of monomers, as hereinafter more fully described, polymerized on polyester polymer substrates.

Hydrophobic polymeric materials of varying origin are commonly employed in the manufacture of various synthetic shaped articles including films, ribbons, fibers, filaments, yarns, threads and the like and related structures, which hereinafter will be illustrated with particular reference to fibers. Polyester polymers may be utilized with great advantage for such purposes.

The fiber-forming, resinous polyester polymer substrates that are contemplated as being adapted for employment in the practice of the present invention include any of the polyester high polymers of the type that are well known in the art and which are capable of being fabricated into useful fiber, film and related structures. Such fiber-forming polyester polymers, which for convenience, will hereinafter be referred to as "polyesters," are the essentially linear condensation products of glycols and polyglycols with dicarboxylic organic acids, which acids are ordinarily aromatic in nature, as, for example, dicarboxylic acids of benzenes, naphthalenes, diphenylene, coupled aromatic nuclei and the like. Suitable polyesters may also be formed from the self-condensation of hydroxy alkyl and hydroxy alkoxy benzoic acids. In particular, the polyester polymers that are contemplated may be similar and analogous to those which have been described, amongst the other places, in United States Letters Patent No. 2,465,319. Specifically, there may be mentioned as especially desirable species of such materials the polyester polymers of terephthalic acid and trimethylene or ethylene glycol, or their mixtures. Polymer substrates in synthetic textile fiber form that are comprised of polyester polymers of terephthalic acid and ethylene glycol are commercially available under the trade name "Dacron." Films of a similar polymer are commercially available under the trade name "Mylar."

Difficulty, however, is often encountered in suitably dyeing synthetic hydrophobic fibers and the like that have been prepared from polyester polymers. This is especially the case when it is attempted to obtain relatively deeper shades of coloration in the finally dyed product.

Various techniques have been evolved for providing polyester polymer compositions of improved dyeability. The practice of such techniques has not always been completely satisfactory. Neither have the products achieved thereby always provided a completely suitable solution to the problems involved. For example, many of the fiber products which are prepared in accordance with the above-identified techniques known to the art often have inferior physical properties when they are compared with those prepared from unmodified polyesters. Also, such products, once they have been prepared, may not be as receptive as might be desired to a wide range of dyestuffs, due to inherent limitations in the materials capable of being employed for enhancing dye-receptivity.

It would be advantageous, and it is the chief aim and concern of the present invention, to provide polyester polymers which have been modified with certain graft or block copolymerized substituents so as to be exceptionally dye-receptive and at the same time retain to a large extent in the final fabricated form of fibers, films and the like and related shaped articles excellent physical properties and other desirable characteristics commensurate with those obtained with the unmodified polyester substrates, and of the general order obtainable with "Dacron," for example. This would possibilitate the manufacture of polyester polymer based fibers and the like articles having the highly desirable combination of attractive physical characteristics and substantial capacity for and acceptance of dyestuffs.

To the attainment of these and related ends, a dye-receptive polymer composition that is adapted to provide shaped articles having excellent physical properties and characteristics while being simultaneously receptive of and dyeable to deep and level shades of coloration with many of a wide variety of dyestuffs is, according to the present invention, comprised of a fiber-forming graft or block copolymer which is comprised or consists essentially of a polyester polymer substrate having a minor proportion of substituents graft copolymerized thereto consisting essentially of polymerized units that have been derived from certain monomers hereinafter identified. Schematically, the compositions may be structurally represented in the following manner:

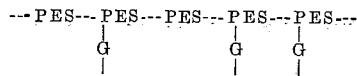

wherein the interlinked "PES" symbols represent the polyester substrate or trunk and the symbols "G" connected thereto the substituent graft copolymer branches of a utilizable monomer provided thereon.

As is apparent, the graft copolymer substituent that is combined with the polyester polymer substrate lends the desired receptivity of and substantivity for various dyestuffs to the compositions while the polyester polymer trunk substrate that is so modified facilitates and secures the excellent physical properties and characteristics of the various shaped articles, including fibers which may result. Advantageously, as mentioned, the polyester polymer substrate that is modified by graft copolymerization to provide the compositions of the invention is a resinous, fiber-forming condensation product of terephthalic acid with ethylene glycol, other α,ω-glycols, and preferably α,ω-glycols of from 2 to 5 carbon atoms, or mixtures of such glycols.

It is usually beneficial, as has been indicated, for the graft copolymer compositions of the present invention to contain a major proportion of the polyester polymer trunk or substrate that has been modified with the substituent dye-receptive graft copolymer groups chemically attached thereto. As a general rule, for example, it is desirable for the graft copolymer to be comprised of at least about 80 percent by weight of the polyester polymer substrate. In many instances, it may be satisfactory for the graft copolymer composition to be comprised of between about 85 and 95 percent by weight of the polyester polymer substrate, particularly when it is "Dacron" or the like resinous product. In this connection, however, better dyeability may generally be achieved when the grafted copolymeric substituents are prepared under such conditions that they have relatively long chain lengths. Thus, it is usually preferable, when identical quantities of grafted substituents are involved for relatively fewer, but longer chain length grafts to be available than to have a greater number of substituents of relatively shorter chain length.

The monomers which are utilized to modify the polyester polymer substrates so as to provide the graft copolymer compositions of the present invention may be any of those selected from the group consisting of vinyl lactam monomers (I); sulfonated alkenyl aromatic monomers of the structural formula:

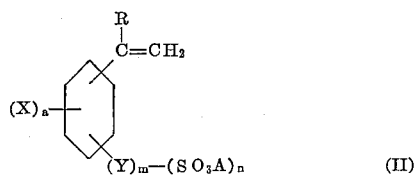

(II)

wherein R is selected from the group consisting of hydrogen, and methyl; X is individually selected from the group consisting of hydrogen, chlorine, bromine, and alkyl radicals containing from 1 to 8 carbon atoms; Y is selected from the group consisting of bivalent and trivalent hydrocarbon radicals containing 1 to 4 carbon atoms; A is selected from the group consisting of hydrogen, alkali metals, and alkyl radicals containing 1 to 5 carbon atoms; $a$ is an integer from 1 to 4; $m$ has a numerical value in whole units of 0 to 1; $n$ is an integer from 1 to 2; sulfonated olefin monomers of the structural formula:

$$CH_2=CZ-(Y)_m-(SO_3A)_n \qquad (III)$$

wherein Z is selected from the group consisting of hydrogen, chlorine, bromine, carboxyl radicals, carboxymethyl radicals, sulfo radicals, cyano radicals, aryl radicals containing from 6 to about 12 carbon atoms, and alkyl radicals containing from 1 to 8 carbon atoms; and Y, A, $m$ and $n$ are as defined above for monomer (II); sulfonated acrylate and methacrylate monomers of the structural formula:

$$CH_2=CR-CO-Q-Y-(SO_3A)_n) \qquad (IV)$$

wherein Q is selected from the group consisting of divalent sulfur (—S—), oxygen (—O—) and amide nitrogen (—NR—); and R, Y, A and $n$ are as defined above for monomer (II); vinyl pyridine monomers of the structural formula:

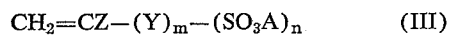

(V)

wherein R, X and $a$ are as defined above for monomer (II); aminated alkenyl aromatic monomers of the structural formula:

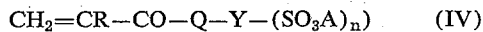

(VI)

wherein T is independently selected from the group consisting of hydrogen, alkyl radicals from 1 to 4 carbon atoms and hydroxyethyl (—CH$_2$—CH$_2$OH) radicals, U is a common anion such as chloride, bromide, sulfate, etc.; and R, X, Y, $a$ and $m$ are as defined above for monomer (II); aminated acrylate and methacrylate monomers of the structural formula:

$$CH_2=CR-CO-Q-Y-NT_2(RU)_m \qquad (VII)$$

wherein R, Q, T, U and $m$ are as defined above for monomers (II), (IV) and (VI); and monomeric polyglycol ethers of alkenyl aromatics of the structural formula:

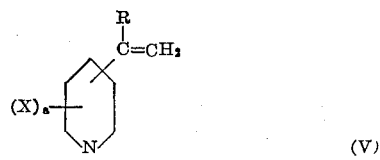

(VIII)

wherein $b$ has an average numerical value between about 1 and 40, advantageously about 10–20, and R, X, Y, T, $a$ and $m$ are as defined above for monomers (II), (IV) and (VI).

In all of the above structural formulae, the symbols C, H, O, N, etc. have their conventional and customary chemical nomenclature.

The vinyl lactam monomers which are utilized to modify the polyester polymer substrates so as to provide the graft copolymer compositions of the present invention may be any of those (or their mixtures) which are variously characterized and generally known to the art as N-vinyl or 1-vinyl lactams. Such monomers as have been described and are involved in U.S. Patents Nos. 2,265,450, 2,317,804, and 2,335,454 may be suitably employed in the practice of the invention.

Similarly, the sulfonated vinyl aromatic and sulfonated olefin monomers that may be employed in the practice of the present invention have also been described and are involved in U.S. Patent No. 2,527,300.

Standard procedures customarily employed in the synthesis of organic compounds are followed to obtain the various desired configurations of the present alkenyl benzyl polyglycol ethers. Two general methods are especially useful in obtaining a wide variety of required monomeric materials.

(1) 4-vinyl benzyl alcohol or its homologues such as isopropenyl benzyl alcohol, vinyl phenyl ethyl alcohol, vinyl phenol (hydroxystyrene), isopropenyl phenol, etc. can be readily reacted with ethylene oxide to produce the corresponding polyglycol ether. The chain length of the polyethylene glycol ether moiety is controlled as desired by the concentration of ethylene oxide and the temperature of reaction.

(2) vinyl benzyl chloride or its homologues react with suitably selected polyglycols or polyglycol derivatives (such as monomethyl ethers) to provide a variety of monomers of the above-indicated scope. The essence of the conditions for these reactions is widely described in the literature as, for example, at page 1167 of "Organic Chlorine Compounds" by E. H. Huntress (Wiley & Sons, 1948).

Typical of the various monomers that may be employed with benefit in the practice of the present invention are those included in the following tabulations, grouped according to general type, wherein the advantageous species to use are designated by the symbol (F):

TABLE 1.—TYPICAL VINYL LACTAMS OF GENERIC TYPE (I)

N-vinyl-pyrrolidone (F)
5-methyl-N-vinyl-pyrrolidone
3,3′-dimethyl-N-vinyl-pyrrolidone
N-vinyl-piperidone
3,3′-dimethyl-N-vinyl-piperidone
N-vinyl-caprolactam (F)
N-vinyl-hexahydrophthalimidine
N-vinyl-5-methyl oxazolidinone (F)

TABLE 2.—TYPICAL SULFONATED AROMATIC MONOMERS OF FORMULA II para-styrene sulfonic acid (F)
ortho-styrene sulfonic acid
para-isopropenyl benzene sulfonic acid
para-vinyl α-toluene sulfonic acid (F, with sodium salt)
para-isopropenyl α-toluene sulfonic acid
sodium para-styrene sulfonate (F)
potassium ortho-styrene sulfonate
methyl ester of para-styrene sulfonic acid
ethyl ester of para-vinyl α-toluene sulfonic acid
isopropyl ester of para-isopropenyl benzene sulfonic acid
n-butyl ester of ortho-styrene sulfonic acid
2-chloro-4-vinyl benzene sulfonic acid
2-bromo-4-isopropenyl benzene sulfonic acid
2-ethyl-4-vinyl-benzene sulfonic acid
2,3-dichloro-4-vinyl-benzene sulfonic acid
3,5-dimethyl-4-vinyl-α-toluene sulfonate, sodium salt
1,3-disulfo-2-(4-vinylbenzyl)propane

TABLE 3.—TYPICAL SULFONATED OLEFIN MONOMERS OF FORMULA III ethylene sulfonic acid (F)
sodium ethylene sulfonate (F)
potassium ethylene sulfonate
methyl ester of ethylene sulfonic acid
isopropyl ethylene sulfonate
1-propene-2-sulfonic acid
1-propene 3-sulfonic acid
1-propene 3-sulfonic acid, ethyl ester (F)
1-butylene 4-sulfonic acid, n-butyl ester
1-butylene 3-sulfonic acid
2-methyl 1-propene 3-sulfonic acid

TABLE 4.—TYPICAL SULFOALKYLACRYLATES OF FORMULA IV 2-sulfoethylacrylate (F)
2-sulfoethylmethacrylate, sodium salt
2-sulfoethylmethacrylate, methyl ester
2-sulfoethylmethacrylate, potassium salt
3-sulopropylacrylate, sodium salt (F)
1,3-disulfo-2-propanol ester of methacrylic acid (F)
N-acryloyl taurine (F)
N-acryloyl taurine, sodium salt
N-methacryloyl taurine, methyl ester
N-methacryloyl taurine, potassium salt
N-acryloyl taurine, ethyl ester (F)
N-acryloyl-aminopropane sulfonic acid
N-methacryloyl-aminopropane sulfonic acid, sodium salt

TABLE 5.—TYPICAL VINYL PYRIDINES OF FORMULA V 2-vinyl pyridine (F)
2-vinyl-4-methyl pyridine (F)
4-vinyl pyridine (F)
2,4-diethyl-6-vinyl pyridine
2-methyl-4-vinyl pyridine
2-vinyl-4-tertiary-butyl pyridine
2-chloro-4-vinyl pyridine

TABLE 6.—TYPICAL ALKENYL AROMATIC AMMONIUM COMPOUNDS OF FORMULA VI 4-vinyl benzyl amine
4-vinyl benzyl-N-methylamine, sulfate
4-vinyl benzyl-N,N-dihydroxyethyl-N-methyl ammonium chloride (F)
2-methyl-4-vinyl-benzyl-N-methyl-N-hldroxyethylamine
2-tertiary-butyl-4-vinyl-benzyl-N,N-dimethylamine
4-vinyl benzyl trimethyl ammonium chloride (F)
N,N-dimethyl-4-vinyl aniline, hydrochloride

TABLE 7.—TYPICAL AMINOETHYL ACRYLATES OF FORMULA VII 2-aminoethylacrylate
2-aminoethylmethacrylate
N-methyl-2-aminoethylacrylate
N-methyl-2-aminoethylmethacrylate
N,N-dimethyl-2-aminoethylacrylate (F)
N,N-dimethyl-2-aminoethylmethacrylate (F)
N-ethyl-2-aminoethylacrylate, hydrochloride
N-ethyl-2-aminoethylmethacrylate
N,N-diethyl-2-aminoethylacrylate
N,N-diethyl-2-aminoethylmethacrylate (F)
N-methyl N-ethyl 2-aminoethylacrylate
N-methyl N-ethyl-2-aminoethylmethacrylate
N,N-dimethyl-1-aminopropylmethacrylate

TABLE 8.—TYPICAL POLYGLYCOL ETHERS OF ALKENYL AROMATICS OF FORMULA VIII 1-(4-vinyl benzyloxy) 2-methoxyethoxy ethane
2-(4-vinyl benzyloxy)-(ethoxy)$_{18}$ ethyl alcohol (F)
2-(4-vinyl benzyloxy)-(ethoxy)$_{18}$ ethyl chloride
2-(4-vinyl phenoxy)-(ethoxy)$_{10}$ ethyl, methyl ether (F)
2-(4-isopropenyl benzyloxy)-(ethoxy)$_{10}$ ethyl alcohol
2-(2-vinyl benzyloxy)-(ethoxy)$_4$ ethyl, ethyl ether
2-(4-vinyl phenoxy)-(ethoxy)$_{16}$ ethyl alcohol
2-(4-isopropenyl phenyl)-2-(2-hydroxy)-(ethoxy)$_{16}$ propane
2-(4-vinyl benzyloxy)-(ethoxy)$_{10}$ ethyl alcohol (F)

If desired, the various diverse types of monomers which are adapted to be employed in the practice of the present invention may be utilized in certain combination or mixtures with one another in order to prepare mixed graft copolymers having specific properties and effects, particularly with respect to their capability for accepting greater numbers of different types of dye-stuffs. For example, the sulfonated monomers ordinarily provide graft copolymers showing excellent acceptance of basic dyestuffs. On the other hand, the nitrogen-containing monomers, i.e., the vinyl pyridine and the aminated monomers, usually provide graft copolymers that exhibit good acceptance of direct and acid-type dyestuffs. Thus, mixtures of such diverse types of monomers may frequently be utilized in beneficial combination with one another in order to enhance the general dye-receptivity of the resulting product.

As mentioned, the graft copolymer compositions of the invention have remarkably good dye-receptivity, particularly in view of their polyester polymer origin. In most cases, for example, the dye-receptivity of the graft copolymer compositions of the present invention is improved to such an extent in comparison with unmodified polyester polymers, particularly unmodified "Dacron," that a color differential of at least about 40 Judd units, as hereinafter illustrated, may readily be obtained between samples of the unmodified polyester polymer substrate and the graft copolymer compositions of the present invention, each of which has been dyed at a 4 percent dyeing, according to conventional techniques with such a dyestuff as Calcodur Pink 2BL. This is a significant advantage when the compositions are fabricated into shaped article form, especially when they are prepared in a filamentary form suitable for use as a textile material.

The Judd unit referred to in the foregoing is described and defined by D. B. Judd in an article in the "American Journal of Psychology," vol. 53, page 418 (1939). More applicable data appears in "Summary on Available Information on Small Color Difference Formulas" by Dorothy Nickerson in the American Dyestuff Reporter, vol. 33, page 252 (June 5, 1944). See also "Interrelation of Color Specifications" by Nickerson in the "Paper Trade Journal," vol. 125, page 153 for November 6, 1947.

As is well known, Calcodur Pink 2BL is a direct type of dye that has a Colour Index 353, more recently designated Colour Index Direct Red 75. It is commercially obtainable under the indicated trade designation. The same dyestuff, which is the sodium salt of 3,3′-disulpho-diphenyl-urea-4,4′-diazobis-2-amino - 8 - naphthol-6-sulfonic acid, is actually available (frequently under several commercial designations) from other sources. Calcodur Pink 2BL has the following structural formula, as is given on page 88, Section A, Part IV of the "Colour Index" (1st Ed., 1924) published by the (British) Society of Dyers and Colourists:

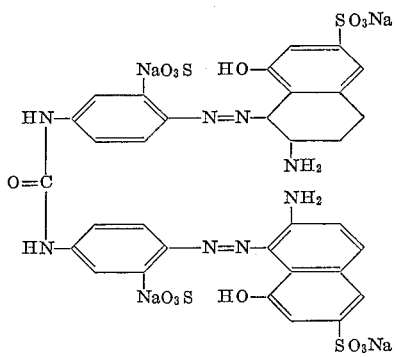

Besides having excellent physical properties and other desirable characteristics, fibers and the like articles comprised of the present compositions similarly have the indicated high capacity for being readily and satisfactorily dyed to deep and level shades of coloration with many dyestuffs. For example, fibers of the present compositions may be easily and successfully dyed according to conventional procedures using acid, vat, acetate, direct, naphthol, and sulfur dyes depending, of course, on the dye-attracting character of the graft copolymerized product of the particular monomer or monomors employed. Such dyestuffs in addition to the particular variety mentioned, by way of didactic illustration, as Calcocid Alizarine Violet (Colour Index 61710, formerly Colour Index 1080), Sulfanthrene Red 3B (Colour Index Vat Violet 2), Amacel Scarlet BS (American Prototype Number 244 and Colour Index Dispersed Red 1 or 11110), Naphthol ASMX (Colour Index 33527), Fast Red TRN Salt (Colour Index Azoic Diazo Component 11), and Immedial Bordeaux G (Colour Index Sulfur Brown 12) may advantageously be employed for such purposes.

Other dyestuffs, by way of further illustration, that may be utilized beneficially on the fiber products of the dye-receptive graft copolymer compositions of the invention include such direct cotton dyes as Chlorantine Fast Green 5BLL (Colour Index Direct Green 27), Clorantine Fast Red 7B (Colour Index Direct Red 81), Pontamine Green GX Conc. 125 percent (Colour Index Direct Green 6), Calcomine Black EXN Conc. (Colour Index Direct Black 38), Niagara Blue NR (Colour Index Direct Blue 151) and Erie Fast Scarlet 4BA (Colour Index Direct Red 24); such acid dyes as Anthraquinone Green GN (Colour Index Acid Green 25), Sulfonine Brown 2B (Colour Index Acid Orange 51), Sulfonine Yellow 2G (Colour Index Acid Yellow 40), Xylene Milling Black 2B (Colour Index Acid Black 26A), Xylene Milling Blue FF (Colour Index Acid Blue 61), Xylene Fast Rubine 3GP PAT (Colour Index Acid Red 57), Calcocid Navy Blue R Conc. (Colour Index Acid Blue 120), Calcocid Fast Blue BL (Colour Index Fast Blue 59), Calcocid Milling Red 3R (Colour Index Acid Red 151), Alizarine Levelling Blue 2R (Colour Index Acid Blue 51), Amacid Azo and Yellow G Extra (Colour Index Acid Yellow 63); such mordant-acid dyes as Alizarine Light Green GS (Colour Index Acid Green 25); such basic dyes as Brilliant Green Crystals (Colour Index Basic Green I) and Rhodamine B Extra S (Colour Index Vat Blue 35); such vat dyestuffs as Midland Vat Blue R Powder (Colour Index Vat Blue 35), Sulfanthrene Brown G Paste (Colour Index Van Brown 5), Sulfanthrene Blue 2B Dbl. Paste (Colour Index Vat Blue 5) and Sulfanthrene Red 3B Paste (Colour Index Van Violet 2); Indigosol Green IB Powder (Colour Index Vat Green 1), a soluble vat dyestuff; such acetate dyes as Celliton Fast Brown 3RA Extra CF (Colour Index Dispersed Orange 5), Celliton Fast Rubine BA CF (Colour Index Dispersed Red 13), Artisil Direct Red 3BP and Celanthrene Red 3BR Conc. (Both Colour Index Dispersed Red 15), Celanthrene Pure Blue BRS 400 percent (Colour Index Dispensed Blue 1) and Acetamine Yellow N (Colour Index Dispersed Yellow 32); B-Naphthol 2-chloro-4-nitroaniline, an azoic dye; such sulfur dyes as Katigen Brilliant Blue GGS High Conc. (Colour Index Sulf. Blue 9) and Indo Carbon CLFS (Colour Index Sulf. Blue 6); and premetallized dyestuffs including Cibalan Yellow GRL (Colour Index Acid Yellow 116); and the like.

The dyed products, especially textile fiber products, are generally lightfast and are well imbued with good resistance to crocking. In additon, dyed textile fiber products comprised of the compositions of the invention exhibit remarkable washfastness, despite repeated exposure and subjection to washing, laundering and dry cleaning treatments. A shaped filamentary article prepared from a dye-receptive composition in accordance with the present invention is schematically illustrated in the sole figure of the hereto annexed drawing.

The dye-receptive graft copolymers of the present invention may be prepared and provided by swelling or impregnating the polyester polymer substrate with the monomeric substance then polymerizing the monomer in situ in the polymer substrate. Advantageously, this may be accomplished when the substrate is in the form of an already-shaped article, such as a fiber or filamentary structure. Beneficially, the graft copolymerization of the impregnated monomer may be accomplished and facilitated with the assistance of a polymerization catalyst or catalyzing influence which, preferentially, interacts with the substrate in order to establish or form grafting sites thereon and simultaneously or subsequently initiate the graft copolymerization. As a practical matter, it is generally most desirable to form the graft copolymer compositions in such manner. Most of the free radical generating chemical catalysts, including peroxide and persulfate catalysts, may be utilized for the desired graft copolymerization. It may often be exceptionally advantageous, however, to accomplish the graft copolymerization by subjecting the monomer-impregnated polyester polymer substrate to a field of high energy radiation in order to efficiently provide an effectively attached graft copolymer of the polymerized monomeric impregnant on the hydrophobic polyester polymer substrate.

The monomer may be intimately impregnated in the polyester polymer substrate in any desired manner prior to the graft copolymerization. Thus, the monomer may be directly applied, particularly when it has a swelling effect on the substrate, or it may be applied from dispersion or solution in suitable liquid vehicles, preferably those tending to swell the polymer, until a desired monomer content has been obtained. Ordinarily, it is advantageous for the monomer to be diluted in a solvent or dispersant vehicle so as to provide a treating bath in which to swell or impregnate the polyester polymer substrate with the latter being immersed in the bath for a sufficient period of time to attain a desired monomer content adequate for the intended purposes. The polyester polymer substrate, as has been mentioned, may be in any fabricated or unfabricated form. Unfabricated graft copolymer compositions in accordance with the present invention may be converted to shaped articles by any desired technique adapted for such purpose with conventional polymers. It is generally desirable and of significant advantage, however, to impregnate a preformed article, such as a textile fiber of the polyester polymer (or a cloth or fabric comprised thereof) with the monomer in order to prepare the graft copolymer compositions of the invention.

In this connection, particularly when preformed fiber structures are involved, the article may be in any desired state of formation for the impregnating and graft copolymerizing modification. Thus, fibers and films may be treated before or after any stretch has been imparted thereto. In addition, they may be in various stages of orientation, or in a gel, swollen or dried condition.

The impregnation and succeeding polymerization may, in general, be effected at temperatures between about 0° C. and about 200° C. for periods of time ranging up to 4 or more hours. The most suitable conditions in each instance may vary according to the nature and quantity of the specific monomeric impregnant involved and the graft copolymerizing technique that is utilized. For example, when chemical catalysts are employed for purposes of forming the graft copolymer, a temperature of between about 50° and 100° C. for a period of time between about 15 and 45 minutes may frequently be advantageously employed for the purpose. Under the influence of high energy radiation, however, it may frequently be of greatest advantage to accomplish the graft copolymerization at temperatures between about 20° and 60° C. utilizing relatively low dose rates and total dosages of the high energy for the desired purpose. Graft copolymerization on preactivated substrates may ordinarily be accomplished by simply exposing the activated substrate to the monomer (preferably in concentrated solution) at an elevated temperature until the graft copolymerized substituents have formed on the substrate.

When the graft copolymer compositions are prepared from preformed or already shaped polyester polymer substrates that are successively impregnated with the monomer, which is then graft copolymerized in situ in the shaped article, excess monomer, if desired, may be squeezed out or removed in any suitable manner prior to effecting the graft copolymerization.

The chemical free radical generating catalysts which may be employed with greatest advantage in the preparation of the graft copolymer compositions of the present invention include hydrogen peroxide, benzoyl peroxide, cumene hydroperoxide, ammonium or potassium persulfate and the like. Such catalysts may be used in conventional quantities to effect the graft copolymerization. When they are utilized, it may be of benefit to incorporate them in the impregnating solution of the monomer that is used.

Actinic light may be advantageously used in some cases to initiate polymerization or to preactivate sites on the substrate polyester. Light having wave lengths in the ultraviolet region is usually preferred.

The high energy radiation which may be employed for inducing the graft copolymerization for the preparation of the graft copolymers of the present invention is of the type which provides emitted particles or photons having an intrinsic energy of a magnitude which is greater than the planetary electron binding energies that occur in the graft copolymerizing materials. Such high energy radiation is available from various radioactive substances which provide beta or gamma radiation as, for example, radioactive elements including cobalt-60 and cesium-137, nuclear reaction fission products and the like. If it is preferred, however, high energy radiation from such sources as electron beam generators, including linear accelerators and resonant transformers, X-ray generators and the like may also be utilized. It is beneficial to employ the high energy radiation in a field of at least about 40,000 roentgens per hour intensity. A roentgen, as is commonly understood, is the amount of high energy radiation as may be provided in a radiation field which produces in one cubic centimeter of air at 0° C. and 760 millimeters of absolute pressure, such a degree of conductivity that one electrostatic unit of charge is measured at saturation (when the secondary electrons are fully utilized and the wall effect of the chamber is avoided). It is most desirable, incidentally, to graft copolymerize all or substantially all of the monomeric impregnant to and with the polyester polymer substrate being modified in order to provide the compositions of the present invention. In addition, as has been indicated, particularly when preactivation of the substrate is performed, ultraviolet light may also be employed as the high energy radiation form. Preactivation or graft site formation with oxygen and ultraviolet light or ozone may also be satisfactory in some instances.

For purposes of specifically illustrating, without intending to thereby limit the invention, the following didactic examples are provided wherein, unless otherwise indicated, all parts and percentages are to be taken by weight.

*Example 1*

A sample of cloth woven from polyethylene terephthalate ("Dacron") yarn was scoured and soaked for about an hour at 75° C. in a 50 percent aqueous solution of N-vinyl pyrrolidone. The polymer was thereby impregnated with about 15 percent of the monomer. The wet fiber was then exposed at a ditsance of about 1 centimeter from a Machlett OEG–50 tube that was being operated at 50,000 volts at 50 milliamperes. The exposure was continued for 25 minutes. The irradiated yarn was then washed thoroughly with water, dried, scoured and dyed for one hour at the boil with 4 percent (on the weight of the fiber and according to the conventional technique) of Calcodur Pink 2BL. A deep and level shade of pink was obtained in the irradiated portion. The remainder of the cloth sample, however, was not even stained by the dyestuff.

The degree of dye-receptivity of the fiber in the irradiated portion of the cloth was evaluated by spectro-photometrically measuring the amount of monochromatic light having a wave length of about 520 millimicrons from a standard source that was reflected therefrom. A numeral reflectance value was thereby obtained which represented the relative comparison of the amount of light that was reflected from the dyed portion of the sample with that which was reflected from a standard white tile reflector, having an arbitrarily assigned reflectance value of 316. Lower reflectance values are an indication of better dye-receptivity in a fiber or other shaped polymer article. For example, a reflectance value of about 20–50 for synthetic hydrophobic fibers of the type that may be benefited by the practice of the method of the present invention (when they are dyed with 4 percent Calcodur Pink 2BL) is generally considered by those skilled in the art to represent a degree of dye-receptivity that meets or exceeds the most rigorous practical requirements and is ordinarily assured of receiving general commercial acceptance and approval. The radiated and dyed colored portion of the cloth had a reflectance value of about 40. The non-irradiated and non-stained portion of the cloth sample had a reflectance value of about 140.

The color yield and differential between the irradiated and non-stained portions of the cloth sample was also determined by a similar reflectance method using the entire visible spectrum from a standard light source and a photoelectric measuring means to indicate the amount of reflected light obtained from each portion of the cloth sample when they were separately exposed to the light source. A numerical value may be calculated in Judd units to indicate the amount of color difference between samples of the same material in an undyed (or lightly dyed) and a dyed condition. A greater numerical value of Judd units, which are frequently employed in the art for measuring color differentials, is an indication of less reflectance and better dye-receptivity and retention in given samples of dyed and undyed polymeric articles, such as cloth or fibers. The color difference between the dyed and undyed portion of the partially radiated cloth sample was about 65 Judd units. The graft copolymerized fiber product was also dyed well to deep and level shades of coloration with Calcocid Alizarine Violet, an acid type of dyestuff (Colour Index 1080); and Amacel Scarlet BS, an acetate type of dyestuff (American Prototype No. 244) obtainable from the American Aniline Products Company.

*Example 2*

The procedure of Example 1 was repeated excepting to employ a 70 percent aqueous solution of the monomer for impregnating the cloth substrate. About 20 percent of the N-vinyl pyrrolidone was thereby incorporated in the cloth. The reflectance value of the finally dyed, radiated portion of the cloth sample was about 20. Its color differential over the undyed portion was about 75 Judd units.

*Example 3*

The procedure of Example 1 was again repeated excepting to use a 90 percent aqueous solution of the monomer. The quantity of impregnant in the cloth was about 25 percent. The results were about the same as in Example 2.

*Example 4*

The procedure of Example 3 was repeated excepting to irradiate a portion of the cloth with a dosage of 0.25 mrep. of 10 million electron volt (m.e.v.) electrons from a linear accelerator. The irradiated portion of the cloth had a significant improvement in its dyeability with Calcodur Pink 2BL.

*Example 5*

The procedure of Example 4 was repeated excepting to impart a 10 mrep. (million roentgen equivalent physicals) dosage of 1 m.e.v. electrons at a 70 mrep. per minute rate from a Van de Graaff electrostatic generator to the radiated portion of the cloth sample which, after washing, was found to contain about 4 percent of polyvinylpyrrolidone by nitrogen analysis. Its dyeability with Calcodur Pink 2BL was noticeably improved in the irradiated portion. Its dyeability therein with Amacel Scarlet BS was even more pronounced in comparison with that of the non-irradiated portion. When the procedure was again repeated with another cloth sample in which only a 1 mrep. dose was effected, the improvement in dyeability was not so great as when the larger dosage was employed.

*Example 6*

The procedure of Example 5 was repeated, excepting to subject the cloth sample to irradiation in the electron beam of the linear accelerator at a rate of about 40 thousand rep. per minute. Similar results were obtained.

*Example 7*

The procedure of Example 5 was repeated excepting to accomplish the irradiation with a one million electron volt resonant transformer. Similar excellent results were obtained in the graft copolymerized fiber product.

*Example 8*

A small sample (about 0.1 gram) of "Dacron" cloth was immersed in a solution of about 2.5 grams of 2-sulfoethyl methacrylate dissolved in a mixture of about 5 milliliters of monomeric N-vinyl pyrrolidone and 5 ml. of N-methyl pyrrolidone for 15 minutes at 70° C. The polymer was impregnated with about 20 percent of the monomer mixture. After the impregnation, the excess monomer solution was permitted to drain from the cloth and the impregnated sample was flushed with nitrogen and subsequently irradiated by exposure at room temperature to a high energy beam from a Van de Graaff Electrostatic Generator operating under a potential of 2 million electron volts with a 250 microampere beam current impinging on a tungsten target. The monomer impregnated cloth sample was subjected to the high energy until a total dosage of about 5 mrep. had been obtained. The sample was rinsed, dried and dyed with a 4 percent Sevron Brilliant Red 4G (Colour Index Basic Red 14) in the conventional manner. A deep and level shade of coloration was obtained in the graft copolymerized product. In comparison, the unmodified yarn could be dyed to only the faintest degree with the same dyestuff.

*Example 9*

A small square of "Dacron" cloth similar to that employed in the first example was immersed in 2-vinyl pyridine and the mixture heated for 15 minutes to a temperature of about 70° C. The monomer impregnated sample was then permitted to drain free of excess liquid and was subsequently transferred to a polyethylene bag wherein it was flushed with nitrogen and sealed. It was then given about a 20 mrep. does of high energy irradiation with a Van de Graaff Generator operating in the manner set forth in the preceding example. The irradiated cloth sample, after being thoroughly washed with water and dried, showed excellent receptivity to Calcocid Alizarine Violet when dyed therewith in the conventional manner.

*Example 10*

The procedure of Example 9 was repeated with the following conditions and results:

| Class | Monomer | Solvent | Dyestuff | Coloration |
|---|---|---|---|---|
| I | N-vinyl 5-methyl oxazolidone | Water | Calcodur Pink 2BL | Excellent. |
| II | p-Styrene sulfonic acid | MP | Sevron Brilliant Red 4G | Do. |
| III | Methyl ethylene sulfonate | Water | do | Good. |
| IV | 2-sulfoethylmethacrylate | MP | do | Excellent. |
| V | N-acryloyl taurine | Water | Amacel Scarlet BS | Do. |
| VI | 4-vinyl benzyl trimethyl ammonium chloride | do | Calcocid Alizarine Violet | Good. |
| VII | N,N-dimethylaminoethyl acrylate | MP | do | Excellent. |
| VIII | 1-(2-methoxyethoxy)-2-vinyl benzyloxy ethane | MP | Amacel Scarlet BS | Do. |

MP = methyl pyrrolidone.

Results similar to the foregoing may also be obtained when any other of the mentioned varieties of monomers of the types of Formulae I through VIII are utilized in a similar manner in place of those set forth in the above examples and when graft copolymers are prepared with such monomers on fabricated or unfabricated forms of the polyester polymer substrate or when the graft copolymerization is accomplished with other varieties of polyester polymers besides those used for purposes of didactic illustration.

What is claimed is:

1. Dye receptive graft copolymer composition compound of (1) a polyester polymer substrate which is a fiber-forming polymer having as an essential ingredient in the polymer chain recurring units of an aromatic nucleus having chemically attached thereto to carbon atoms in its chain, as graft copolymerized substituents thereon, a minor proportion of up to about 20 weight percent based on the weight of the composition, of units consisting of (2) a polymerized monomer selected from the group of monomers consisting of vinyl lactam monomers (I); sulfonated aromatic monomers of the structural formula:

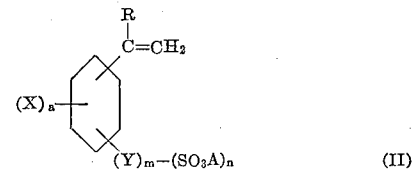

(II)

wherein R is selected from the group consisting of hydrogen, and methyl, X is individually selected from the group consisting of hydrogen, chlorine, bromine, and alkyl radicals containing from 1 to 8 carbon atoms, Y is selected from the group consisting of bivalent and trivalent hydrocarbon radicals containing 1 to 4 carbon atoms, A is selected from the group consisting of hydrogen, alkali metals, and alkyl radicals containing 1 to 5 carbon atoms, $a$ is an integer from 1 to 4; $m$ has a numerical value in whole units of 0 to 1, $n$ is an integer from 1 to 2, sulfonated olefin monomers of the structural formula:

$$CH_2=CZ-(Y)_m-(SO_3A)_n \qquad (III)$$

wherein Z is selected from the group consisting of hydrogen, chlorine, bromine, carboxyl radicals, carboxymethyl radicals, sulfo radicals, cyano radicals, aryl radicals containing from 6 to 12 carbon atoms, and alkyl radicals containing from 1 to 8 carbon atoms, and Y, A, $m$ and $n$ are as defined above for monomer (II); sulfonated acrylate and methacrylate monomers of the structural formula:

$$CH_2=CR-CO-Q-Y-(SO_3A)_n \qquad (IV)$$

wherein Q is selected from the group consisting of divalent sulfur, oxygen and amide nitrogen, and R, Y, A and $n$ are as defined above for monomer (II); vinyl pyridine monomers of the structural formula:

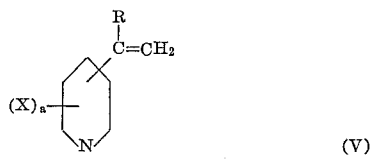

(V)

wherein R, X and $a$ are as defined above for monomer (II); aminated alkenyl aromatic monomers of the structural formula:

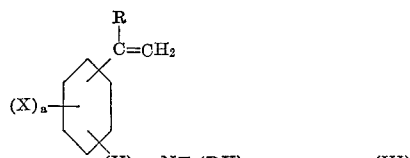

(VI)

wherein T is independently selected from the group consisting of hydrogen, alkyl radicals from 1 to 4 carbon atoms and hydroxyethyl radicals, U is a common anion and R, X, Y, $a$ and $m$ are as defined above for monomer (II); aminated acrylate and methacrylate monomers of the structural formula:

$$CH_2=CR-CO-Q-Y-NT_2(RU)_m \qquad (VII)$$

wherein R, Q, Y, T, U and $m$ are as defined above for monomers (II), (IV) and (VI); and monomeric polyglycol ethers of alkenyl aromatics of the structural formula:

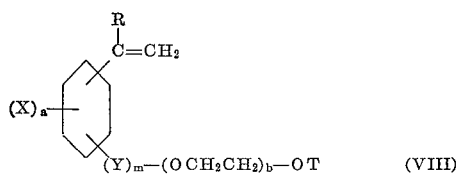

(VIII)

wherein $b$ has an average numerical value between about 1 and 40, and R, X, Y, T, $a$ and $m$ are as defined above for monomers (II), (IV) and (VI).

2. The composition of claim 1, wherein said polyester polymer substrate has between about 5 and 15 percent by weight, based on the weight of the composition, of said graft copolymerized substituents attached thereto.

3. The composition of claim 1, wherein said polyester polymer substrate is a resinous condensation product of terephthalic acid and an α,ω-glycol of from 2 to 5 carbon atoms.

4. The composition of claim 1, wherein said graft copolymer substituents are comprised of a polymerized N-vinyl lactam.

5. The composition of claim 1, wherein said graft coploymer substituents are comprised of a polymerized aromatic sulfonate of Formula II.

6. The composition of claim 1, wherein said polyester polymer substrate is a resinous condensation product of terephthalic acid and an α,ω-glycol of from 2 to 5 carbon atoms and wherein said graft copolymerized substituents are present in an amount up to about 20 percent by weight, based on the weight of the composition, and are comprised of a polymerized N-vinyl lactam.

7. A filamentary shaped article comprised of the composition set forth in claim 6.

8. A filamentary shaped article comprised of the composition set forth in claim 1.

9. Method for the preparation of a dye-receptive graft copolymer which consists essentially of contacting a fiber-forming polyester polymer having as an essential ingredient in the polymer chain recurring units of an aromatic nucleus with a monomer selected from the group of monomers consisting of vinyl lactam monomers (I); sulfonated aromatic monomers of the structural formula:

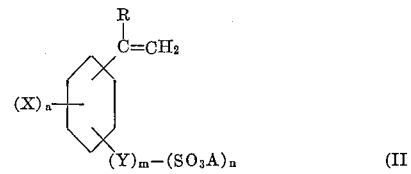

(II)

wherein R is selected from the group consisting of hydrogen, and methyl, X is individually selected from the group consisting of hydrogen, chlorine, bromine, and alkyl radicals containing from 1 to 8 carbon atoms, Y is selected from the group consisting of bivalent and trivalent hydrocarbon radicals containing 1 to 4 carbon atoms, A is selected from the group consisting of hydrogen, alkali metals, and alkyl radicals containing 1 to 5 carbon atoms, $a$ is an integer from 1 to 4, $m$ has a numerical value in whole units of 0 to 1, $n$ is an integer from 1 to 2; sulfonated olefin monomers of the structural formula:

$$CH_2=CZ-(Y)_m-(SO_3A)_n \qquad (III)$$

wherein Z is selected from the group consisting of hydrogen, chlorine, bromine, carboxyl radicals, carboxymethyl radicals, sulfo radicals, cyano radicals, aryl radicals containing from 6 to 12 carbon atoms, and alkyl radicals containing from 1 to 8 carbon atoms, and Y, A, $m$ and $n$ are as defined above for monomer (II); sulfonated acrylate and methacrylate monomers of the structural formula:

$$CH_2=CR-CO-Q-Y-(SO_3A)_n \qquad (IV)$$

wherein Q is selected from the group consisting of divalent sulfur, oxygen and amide nitrogen, and R, Y, A and $n$ are as defined above for monomer (II); vinyl pyridine monomers of the structural formula:

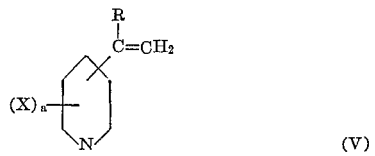

(V)

wherein R, X and $a$ are as defined above for monomer (II); aminated alkenyl aromatic monomers of the structural formula:

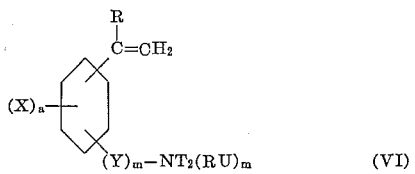

(VI)

wherein T is independently selected from the group consisting of hydrogen, alkyl radicals from 1 to 4 carbon atoms and hydroxyethyl radicals, U is a common anion and R, X, Y, $a$ and $m$ are as defined above for monomer (II); aminated acrylate and methacrylate monomers of the structural formula:

$$CH_2=CR-CO-Q-Y-NT_2(RU)_m \quad (VII)$$

wherein R, Q, Y, T, U and $m$ are as defined above for monomers (II), (IV) and (VI); and monomeric polyglycol ethers of alkenyl aromatics of the structural formula:

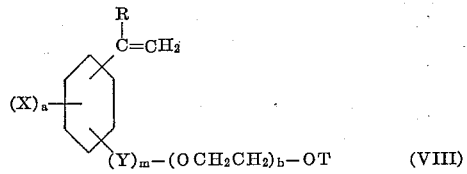

(VIII)

wherein $b$ has an average numerical value between about 1 and 40, and R, X, Y, T, $a$ and $m$ are as defined above for monomers (II), (IV) and (VI); then polymerizing said monomer in contact with said polymer until said monomer is graft copolymerized on said polymer.

References Cited by the Examiner
UNITED STATES PATENTS
2,837,496   6/1958   Vandenberg _____ 260—45.4
FOREIGN PATENTS
764,299   12/1956   Great Britain.

JOSEPH L. SCHOFER, *Primary Examiner.*
DONALD E. CZAJA, *Examiner.*
H. WONG, *Assistant Examiner.*